US011257068B2

(12) United States Patent
Lee

(10) Patent No.: US 11,257,068 B2
(45) Date of Patent: Feb. 22, 2022

(54) METHOD, SYSTEM AND RECORDING MEDIUM FOR PAYMENT SERVICE

(71) Applicant: NHN PAYCO CORPORATION, Seongnam-si (KR)

(72) Inventor: Joon ho Lee, Seongnam-si (KR)

(73) Assignee: NHN PAYCO CORPORATION, Seongnam-si (KR)

( * ) Notice: Subject to any disclaimer, the term of this patent is extended or adjusted under 35 U.S.C. 154(b) by 596 days.

(21) Appl. No.: 14/825,445

(22) Filed: Aug. 13, 2015

(65) Prior Publication Data

US 2016/0048828 A1 Feb. 18, 2016

(30) Foreign Application Priority Data

Aug. 14, 2014 (KR) ........................ 10-2014-0105983
Aug. 14, 2014 (KR) ........................ 10-2014-0106143

(51) Int. Cl.
*G06Q 20/36* (2012.01)
*G06Q 20/34* (2012.01)
*G06Q 20/40* (2012.01)

(52) U.S. Cl.
CPC ........... *G06Q 20/354* (2013.01); *G06Q 20/36* (2013.01); *G06Q 20/401* (2013.01)

(58) Field of Classification Search
CPC .. G06Q 20/354; G06Q 20/3265; G06Q 20/36; G06Q 20/401; G06Q 20/326
USPC ........................................................... 705/39
See application file for complete search history.

(56) References Cited

U.S. PATENT DOCUMENTS 7,954,706 B2 * 6/2011 Calabrese .............. G06Q 20/40 235/379
9,767,453 B2 * 9/2017 Kushevsky ........ G06Q 20/3674
10,496,990 B2 * 12/2019 Pourfallah ............. G06Q 20/10
2007/0138299 A1 * 6/2007 Mitra ................ G06K 19/0719 235/492

(Continued)

FOREIGN PATENT DOCUMENTS

JP 2009-212733 9/2009
JP 2003-316984 11/2013

(Continued)

OTHER PUBLICATIONS

Japanese Office Action dated Apr. 19, 2017, in JP Application No. 2015-159155.

*Primary Examiner* — Scott S Trotter
(74) *Attorney, Agent, or Firm* — H.C. Park & Associates, PLC

(57) ABSTRACT

Provided are a method, system, and computer-readable medium for a payment service using a card of an integrated function. A payment service method may include registering a representative card that represents payment tools of a user, the representative card being an electronic card configured to be activated through an application installed in a terminal of the user; activating a payment function of the representative card through the application, the application being associated with a payment service installed in the terminal of the user; setting at least one specific payment tool to be represented by the representative card among the payment tools; and processing a payment using the specific payment tool set in the representative card, in response to a payment request using the representative card.

13 Claims, 10 Drawing Sheets

(56) References Cited

U.S. PATENT DOCUMENTS

| | | | | |
|---|---|---|---|---|
| 2012/0123841 | A1* | 5/2012 | Taveau | G06Q 30/0222<br>705/14.23 |
| 2013/0226792 | A1* | 8/2013 | Kushevsky | G06Q 20/322<br>705/41 |
| 2014/0046788 | A1* | 2/2014 | Lee | G06Q 20/363<br>705/21 |
| 2014/0195424 | A1* | 7/2014 | Zheng | G06Q 20/36<br>705/41 |
| 2014/0257958 | A1* | 9/2014 | Andrews | G06Q 30/0226<br>705/14.27 |
| 2014/0279474 | A1* | 9/2014 | Evans | G06Q 20/40<br>705/41 |
| 2016/0321628 | A1* | 11/2016 | Xu | G06Q 20/34 |

FOREIGN PATENT DOCUMENTS

| | | |
|---|---|---|
| JP | 2014-504408 | 2/2014 |
| KR | 10-2007-0072812 | 7/2007 |
| KR | 10-2011-0064119 | 6/2011 |
| KR | 10-1161778 | 7/2012 |
| KR | 10-2013-0083029 | 7/2013 |
| KR | 10-1307035 | 9/2013 |
| KR | 10-2014-0077013 | 6/2014 |
| WO | 2007/116521 | 10/2007 |

* cited by examiner

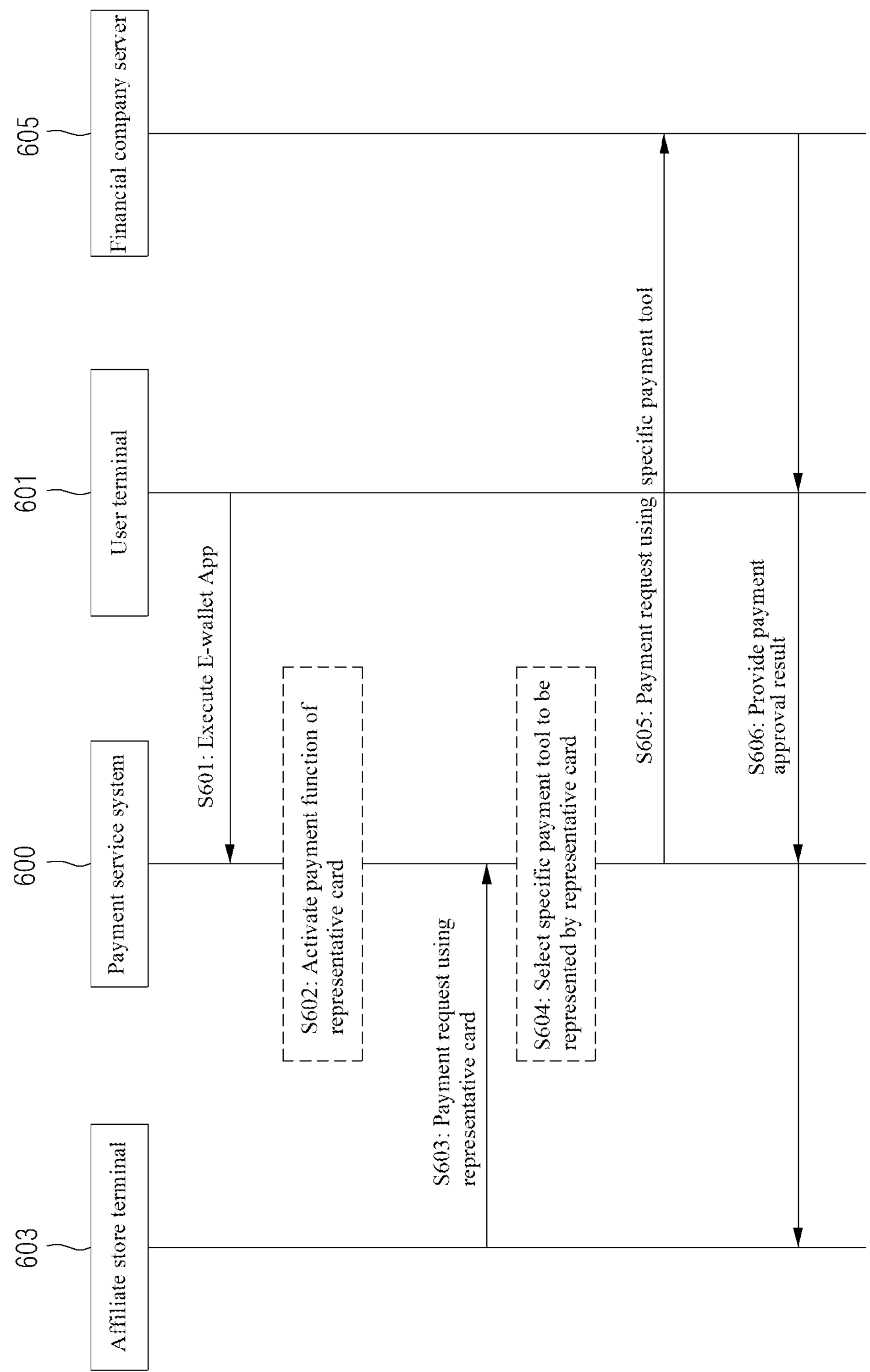
FIG. 6
605
Financial company server
601
User terminal
600
Payment service system
603
Affiliate store terminal
S601: Execute E-wallet App
S602: Activate payment function of representative card
S603: Payment request using representative card
S604: Select specific payment tool to be represented by representative card
S605: Payment request using specific payment tool
S606: Provide payment approval result

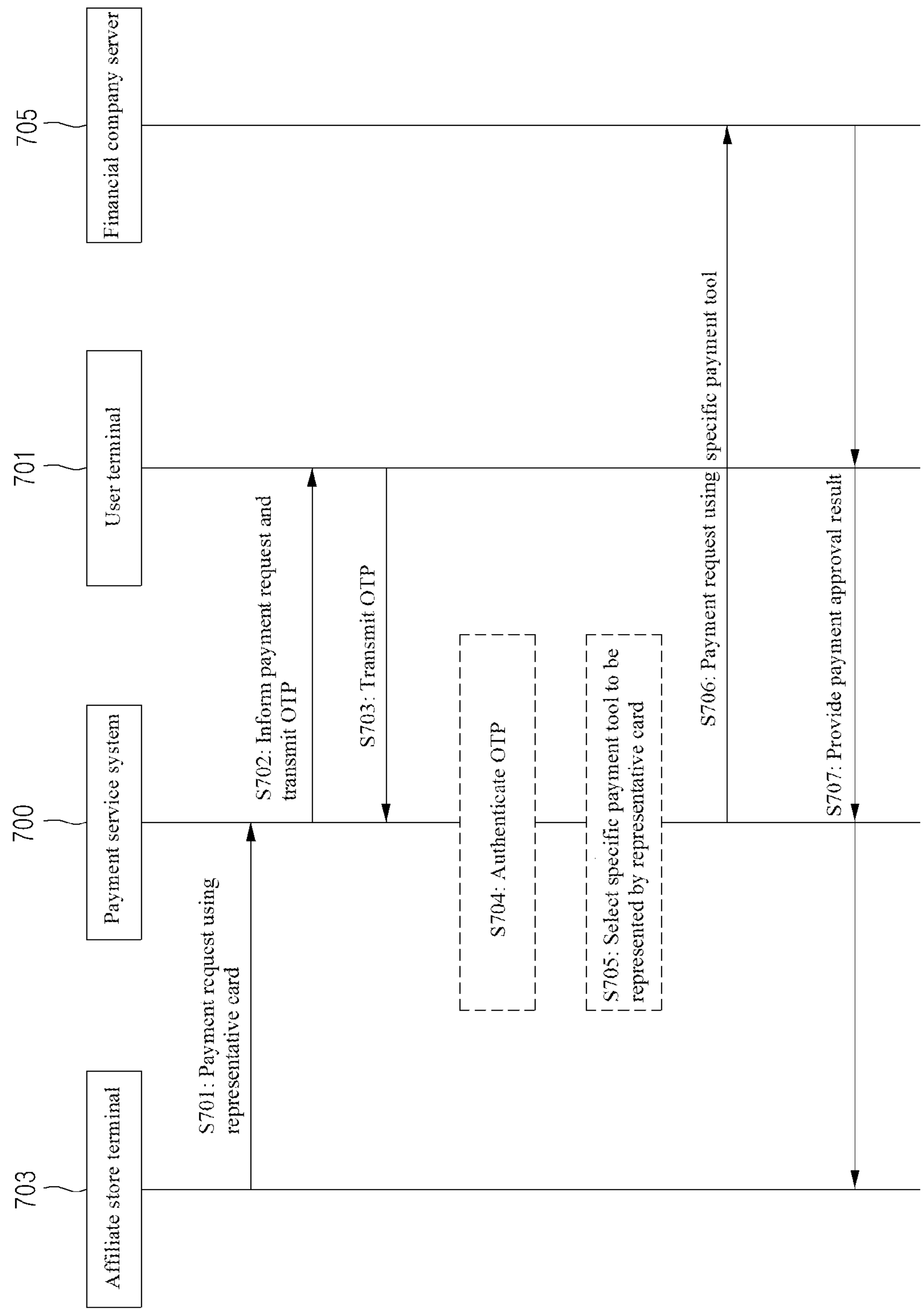
FIG. 7
705
Financial company server
701
User terminal
700
Payment service system
703
Affiliate store terminal
S701: Payment request using representative card
S702: Inform payment request and transmit OTP
S703: Transmit OTP
S704: Authenticate OTP
S705: Select specific payment tool to be represented by representative card
S706: Payment request using specific payment tool
S707: Provide payment approval result

METHOD, SYSTEM AND RECORDING MEDIUM FOR PAYMENT SERVICE

CROSS-REFERENCE TO RELATED APPLICATIONS

This application claims priority from and the benefit of Korean Patent Application No. 10-2014-0106143, filed on Aug. 14, 2014 and Korean Patent Application No. 10-2014-0105983, filed on Aug. 14, 2014, all of which are hereby incorporated by reference for all purposes as if fully set forth herein.

BACKGROUND

Field

Exemplary embodiments relate to a method, system, and recording medium for a payment service using an alternative method.

Discussion of the Background

Due to portability and convenience in use, a payment tool (e.g., a payment card) in a form of a card, such as a credit card, a check card, a debit card, and a cash card, has been widely used.

A payment method using a payment card refers to a method in which information, for example, a card number, a valid institution, and a card issuer, required to approve a card transaction is provided to a terminal installed in an affiliate store, the affiliate store requests a card company to approve a transaction, and a payment is processed based an approval result.

However, in an existing card payment service method, a payment is made in a state in which actual card information is exposed to the affiliate store. Thus, there are some constraints in protecting personal card information. Further, a card number and an expiry date of the payment card are repeatedly used until the payment card is expired. Thus, the personal information may be used for malicious purposes through e.g., hacking.

As an example of technologies regarding the above issue, Korean Patent Application Publication No. 10-2002-0096353, published on Dec. 31, 2002, titled "one-time virtual card service system and method thereof", discloses a method for generating a new one-time virtual card each time and using the generated virtual card for a payment.

The aforementioned method requires a separate system to generate a disposable, one-time virtual card, and thus, the entire payment system may be enlarged and costs used to construct the payment system may increase. In addition, every time a payment is required, a one-time virtual card needs to be issued and thus, a user cannot make a quick payment and a payment procedure thereof may be complex and inconvenient.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a payment service method and system that may perform a safe and convenient payment while protecting information of a payment tool.

Exemplary embodiments also provide a payment service method and system that may perform an online/offline payment using a representative card capable of representing all of the payment tools.

Exemplary embodiments also provide a payment service method and system that may conveniently select and change a payment tool set in a representative card.

Exemplary embodiments also provide a payment service method and system that may further enhance security of a representative card.

Additional features of the invention will be set forth in the description which follows, and in part will be apparent from the description, or may be learned by practice of the invention.

An exemplary embodiment discloses a payment service method executed in a computer, the method including registering a representative card that represents payment tools of a user, the representative card being an electronic card configured to be activated through an application installed in a terminal of the user; activating a payment function of the representative card through the application, the application being associated with a payment service installed in the terminal of the user; setting at least one specific payment tool to be represented by the representative card among the payment tools; and processing a payment using the specific payment tool set in the representative card, in response to a payment request using the representative card.

An exemplary embodiment also discloses a payment service method executed in a computer, the method including registering a representative card that represents payment tools of a user, the representative card being an electronic card configured to be activated through an application installed in a terminal of the user; setting a specific payment tool associated with location information of the user among the payment tools based on the location information; and processing a payment using the specific payment tool set in the representative card, in response to a payment request using the representative card.

An exemplary embodiment discloses a payment service system including a registerer configured to register a representative card that represents payment tools of a user, the representative card being an electronic card configured to be activated through an application installed in a terminal of the user; a setter configured to set at least one specific payment tool to be represented by the representative card among the payment tools; and a payment processor configured to activate a payment function of the representative card through an application associated with a payment service installed in a terminal of the user, and to process a payment using the specific payment tool set in the representative card, in response to a payment request using the representative card.

An exemplary embodiment also discloses a payment service system including a registerer configured to register a representative card that represents payment tools of a user, the representative card being an electronic card configured to be activated through an application installed in a terminal of the user; a setter configured to set a specific payment tool associated with location information of the user among the payment tools based on the location information; and a payment processor configured to process a payment using the specific payment tool set in the representative card, in response to a payment request using the representative card.

An exemplary embodiment further discloses a payment service method executed in a computer, the method including registering a representative card that represents payment tools of a user, the representative card being an electronic card configured to be activated through an application installed in a terminal of the user; setting at least one specific payment tool to be represented by the representative card among the registered payment tools; and processing a payment using the specific payment tool set in the representative card, in response to a payment request using the representative card. A payment function of the representative card may be approved based on an authentication method using a one-time password (OTP).

An exemplary embodiment also discloses a payment service method executed in a computer, the method including registering a representative card that represents payment tools of a user, the representative card being an electronic card configured to be activated through an application installed in a terminal of the user; generating a first OTP in response to a payment request using the representative card, and transmitting the first OTP to a terminal of the user; approving a payment function of the representative card by comparing the first OTP with a second OTP in response to receiving the second OTP by an input of the user from the terminal; setting at least one specific payment tool to be represented by the representative card among the payment tools; and processing a payment using the specific payment tool set in the representative card, in response to the payment request.

An exemplary embodiment also discloses a payment service method executed in a computer, the method including registering a representative card that represents payment tools of a user, the representative card being an electronic card configured to be activated through an application installed in a terminal of the user; setting at least one specific payment tool to be represented by the representative card among the payment tools in response to a payment request using the representative card; and processing a payment using the specific payment tool set in the representative card in interaction with a financial company server associated with the specific payment tool. The financial company server may generate a first OTP in response to the payment request and transmit the first OTP to a terminal of the user, and may approve the payment function of the representative card by comparing the first OTP with a second OTP in response to receiving the second OTP by an input of the user from the terminal.

An exemplary embodiment also discloses a payment service method executed in a computer, the method including registering a representative card that represents payment tools of a user, the representative card being an electronic card configured to be activated through an application installed in a terminal of the user; transmitting a message associated with a payment request to a terminal of the user in response to the payment request using the representative card; receiving, from the terminal, a first OTP that is generated at the terminal in response to the payment request, and receiving, from a terminal of an affiliate store, a second OTP presented by the user; approving a payment function of the representative card by comparing the first OTP with the second OTP; setting at least one specific payment tool to be represented by the representative card among the payment tools; and processing a payment using the specific payment tool set in the representative card, in response to the payment request.

An exemplary embodiment further discloses a payment service method including a registerer configured to register a representative card that represents the payment tools of a user, the representative card being an electronic card configured to be activated through an application installed in a terminal of the user; a setter configured to set at least one specific payment tool to be represented by the representative card among the payment tools; and a payment processor configured to process a payment using the specific payment tool set in the representative card, in response to a payment request using the representative card. A payment function of the representative card may be approved based on an authentication method using an OTP.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 6 illustrates a payment process using a representative card according to an exemplary embodiment.

FIG. 7, FIG. 8, and FIG. 9 illustrate a payment process using a representative card according to an exemplary embodiment.

DETAILED DESCRIPTION OF THE ILLUSTRATED EMBODIMENTS

Figure 1:
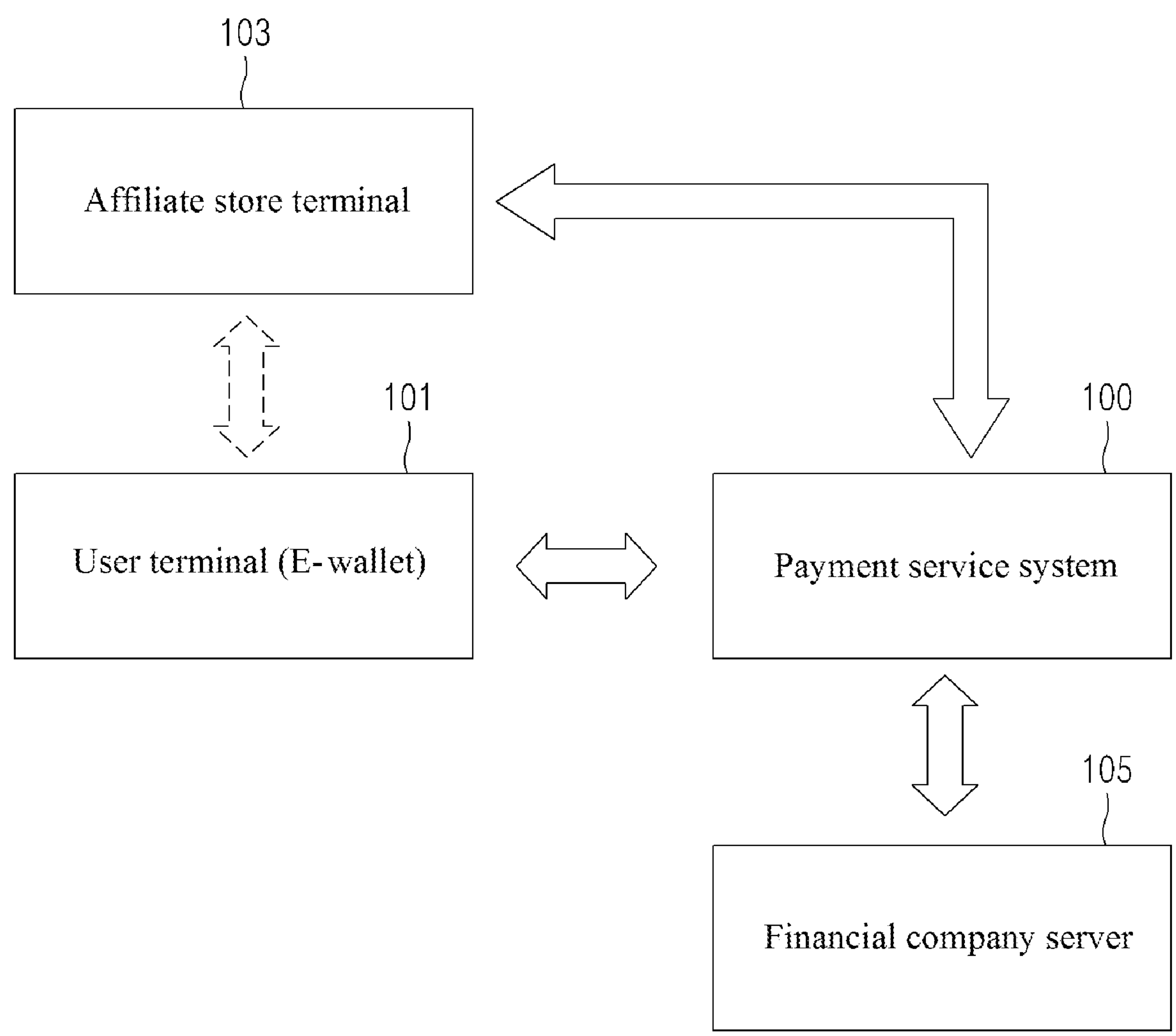
FIG. 1 is a diagram illustrating a payment environment using a representative card according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element is referred to as being "on," "connected to," or "coupled to" another element or layer, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described in detail with reference to the accompanying drawings.

Exemplary embodiments relate to a payment model, and more particularly, to a relay payment model that may process a payment process by relaying a payment process between an affiliate store and a financial institution, for example, a card company, a bank, and a communication provider. The payment model may be applicable to both a face-to-face payment environment of an offline store and a non-facing payment environment of an online store.

The term "payment tool" used herein may inclusively indicate any type of payment tools, such as cards including a credit card, a check card, and a mobile card, an account, a mobile phone, mileage, a coupon, and a gift certificate, capable of paying an amount, and a payment tools, such as a mileage saving card, capable of receiving rewards determined for a paid amount.

FIG. 1 is a diagram illustrating a payment service environment according to an exemplary embodiment. FIG. 1 illustrates a user terminal 101, an affiliate store terminal 103, a financial company server 105, and a payment service system 100. In FIG. 1, arrow indicators may indicate that data may be transmitted and received over a wired or wireless network.

The payment service system 100 may serve as a payment relay server (not shown) that provides a payment service through interaction with the financial company server 105. The payment service system 100 may include an application (hereinafter, an E-wallet App) configured to be executed on a terminal and an Internet platform configured to separately manage and process the payment service. Specifically, the payment service system 100 may be included in a platform that provides the payment service in a client-server environment in interaction with the E-wallet App executed on the user terminal 101. The payment service system 100 may process a payment using a representative card capable of integrating and representing all of payment tools registered by a user. The payment service system 100 may be constructed in a form of a one-to-one system for each financial company or may be configured as a separate integrated system for a service provided to a plurality of financial companies.

The representative card used herein may be issued from the payment service system 100 or an institution associated with the payment service system 100, and may be issued in a form of a real card, for example, a credit card, or a multi-dimensional code, for example, a barcode and a quick response (QR) code. Further, the representative card may include a serial number for identifying a card. For example, the serial number may be printed on one side of the real card, and may be included as a code in the multi-dimensional code.

The user refers to an entity that purchases a product in a face-to-face payment environment of an offline store and a non-facing payment environment of an online shopping mall, and may request a payment for a purchase amount by presenting the representative card at an affiliate store. To this end, the E-wallet App may be installed in the user terminal 101, a terminal device used by the user. For example, in addition to the E-wallet App configured in a form of an application, the representative card may be installed in the user terminal 101 in a plug-in form as a program associated with the payment service system 100 and may control the user terminal 101 or a web browser of the user terminal 101. A plug-in technique relates to a structure for displaying various types of files incapable of being displayed by the web browser on a window of the web browser using software created by a third party. The plug-in technique relates to integrally operating with the web browser and operating as if the web browser itself has a file display function without opening a separate application window. The user terminal 101 may be any type of terminal device, for example, a personal computer (PC), a laptop computer, a smartphone, and a tablet, capable of connecting to a website/mobile site associated with the payment service system 100 or installing and executing a service exclusive application. The user terminal 101 may perform the overall service configuration, such as a service screen configuration, a data input, a data transmission and reception, a data storage, or the like, under the control of the program associated with the payment service system 100.

The affiliate store used herein refers to an entity that sells a product in a face-to-face payment environment of an offline store or a non-facing payment environment of an online shopping mall, and may process a payment for a purchase amount of the user using a representative card presented by the user. The affiliate store terminal 103 may be a terminal device used at the affiliate store and may use an exclusive payment terminal such as a point of sales (POS) installed in the affiliate store or a communication terminal, such as a smartphone or a tablet, in which a service exclusive program for payment is installed, in the face-to-face payment environment. On the other hand, in the non-facing payment environment, an online shopping mall server of the affiliate store or a payment server associated with the online shopping mall serves as the affiliate store terminal 103. In this example, the affiliate store terminal 103 may perform a payment process through communication with the payment service system 100.

The financial company server 105 refers to a server system of any institution, for example, a card company, a bank, a communication provider, a mileage company, and a coupon proxy company, capable of issuing a payment tool to a user.

According to an exemplary embodiment, it is possible to protect a payment process using a representative card in interaction with an E-wallet App on the user terminal 101 as a secure payment method in preparation for loss of the representative card.

Further, according to an exemplary embodiment, it is possible to apply, as a secure payment method, a method of authenticating a user of a representative card using a randomly generated one-time password (OTP) instead of using a fixed password. An authentication method using an OTP may include, for example, a method of storing OTP information in the payment service system 100 that serves as a payment relay server and authenticating a user in the payment service system, a method of storing OTP information in the financial company server 105 and authenticating the user in the financial company server 105, and a method of storing OTP information in the user terminal 101 and authenticating the user in the payment service system 100.

Hereinafter, the secure payment method will be further described.

Figure 2:
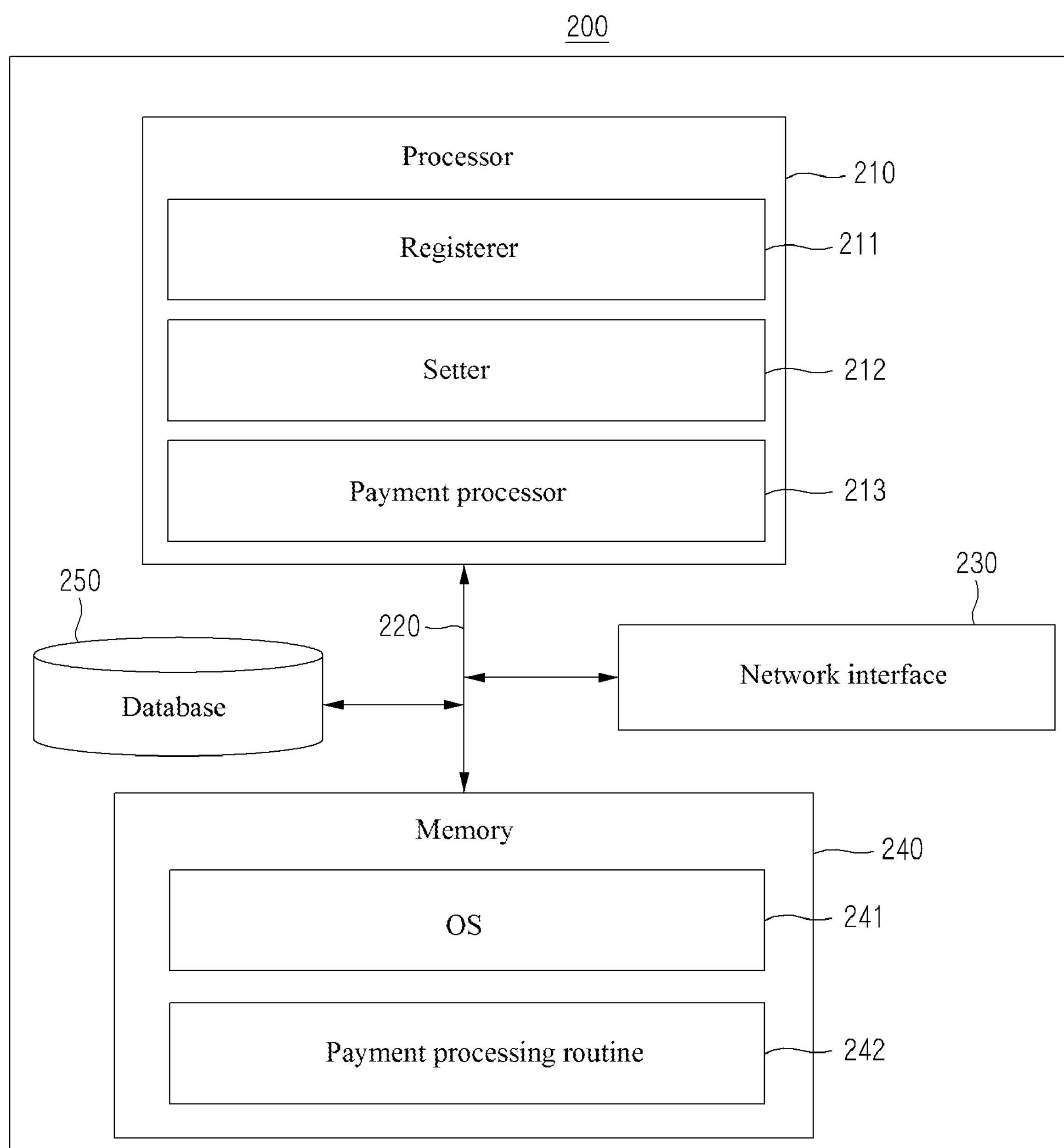
FIG. 2 is a block diagram illustrating a configuration of a payment service system using a representative card according to an exemplary embodiment.
Figure 3:
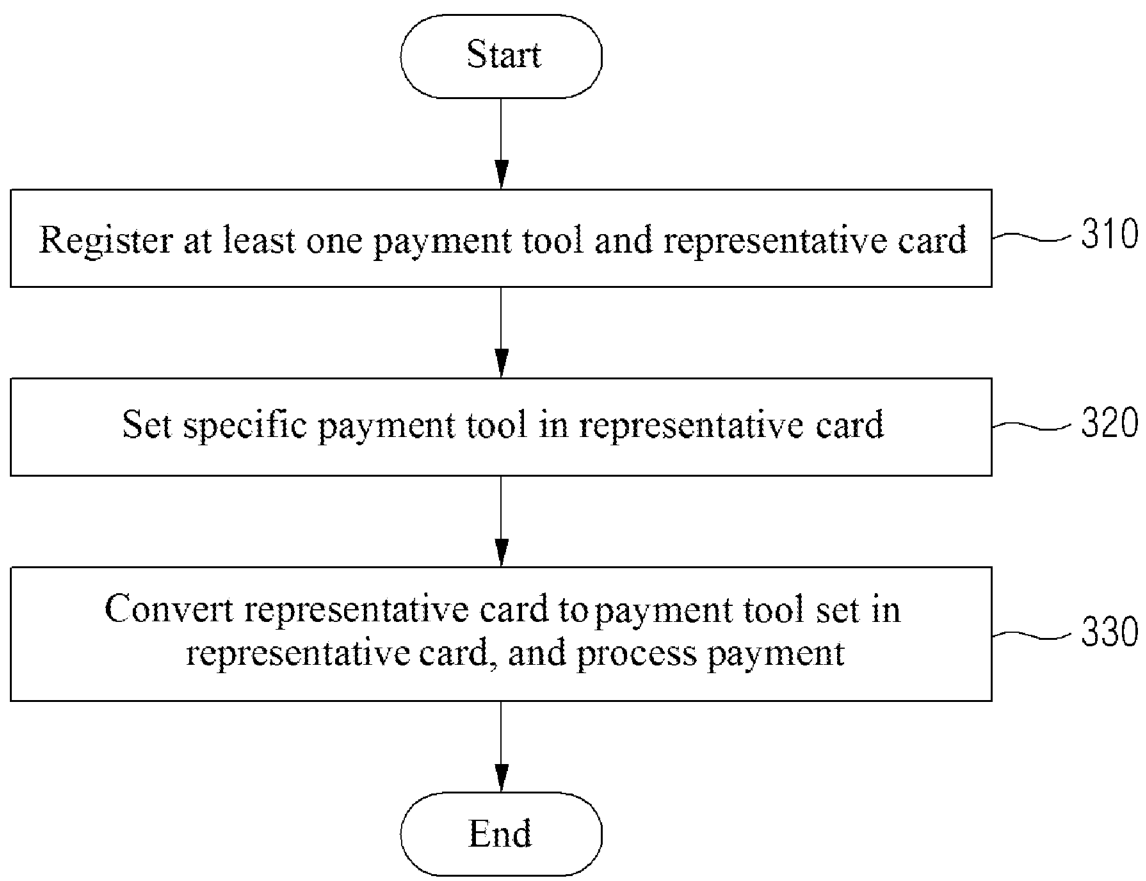
FIG. 3 is a flowchart illustrating a payment service method using a representative card according to an exemplary embodiment.

FIG. 2 is a block diagram illustrating a configuration of a payment service system using a representative card according to an exemplary embodiment, and FIG. 3 is a flowchart illustrating a payment service method using a representative card according to an exemplary embodiment.

Referring to FIG. 2, the payment service system 200 may include a processor 210, a bus 220, a network interface 230, a memory 240, and a database 250. The memory 240 may include an operating system (OS) 241 and a payment processing routine 242. The processor 210 may include a registerer 211, a setter 212, and a payment processor 213. According to an exemplary embodiment, the payment service system 200 may include more constituent elements than the constituent elements illustrated in FIG. 2.

The memory 240 may include a permanent mass storage device, such as a random access memory (RAM), a real only memory (ROM), and a disc drive, as a computer-readable storage medium. Also, program codes for the OS 241 and the payment processing routine 242, and the like, may be stored in the memory 240. Such software constituent elements may be loaded from another computer-readable storage medium separate from the memory 240 using a drive mechanism (not shown). The other computer-readable storage medium may include, for example, a floppy drive, a disc, a tape, a DVD/CD-ROM drive, and a memory card. Software constituent elements may be loaded to the memory 240 through the network interface 230 instead of using the computer-readable storage medium.

The bus 220 enables communication and data transmission between the constituent elements of the payment service system 200. The bus 220 may be configured using a high-speed serial bus, a parallel bus, a storage area network (SAN), and/or another appropriate communication technology.

The network interface 230 may be a computer hardware constituent element for connecting the payment service system 200 to the computer network. The network interface 230 may connect the payment service system 200 to the computer network through a wireless or wired connection.

The database 250 serves to store and maintain all or some pieces of information to provide a payment service. The database 250 may store and maintain information, for example, a card number, an account number, a mobile phone number, a coupon number, and a gift certificate number, about a payment tool registered by a user and information about a representative card capable of representing payment tools of the user in association with the user. Although FIG. 2 illustrates that the database 250 is included in the payment service system 200, the database 250 may be present as an external database constructed in a separate system. One or more payment tools of a user may be registered in a user terminal of the user. Also, the registered payment tools may be linked to a representative card of the user through the registration, an activation process of the representative card, and a linking process between the activated representative card and at least one payment tool.

The processor 210 may be configured to process computer-readable instructions of a computer program by performing basic calculations, logical operations, and input/output operations of the payment service system 200. The computer-readable instructions may be provided from the memory 240 or the network interface 230 to the processor 210 through the bus 220. The registerer 211, the setter 212, and the payment processor 213 included in the processor 210 may be configured to execute program codes or the computer-readable instructions. The program codes may be stored in a storage device such as the memory 240.

When executed by a processor, such as the processor 210, the computer-readable instructions associated with the registerer 211, the setter 212, and the payment processor 213 may specially configure the processor to perform operations 310 through 330 of FIG. 3. For example, the processor 210 may load the program codes or the computer-readable instructions for the payment service method from at least one file of an application (e.g., an E-wallet App) to memory (e.g., the memory 240), when the application is executed. Each of the registerer 211, the setter 212, and the payment processor 213 may be configured to execute the corresponding part of the program codes or the computer-readable instructions to perform operations 310 through 330 of FIG. 3.

Figure 4:
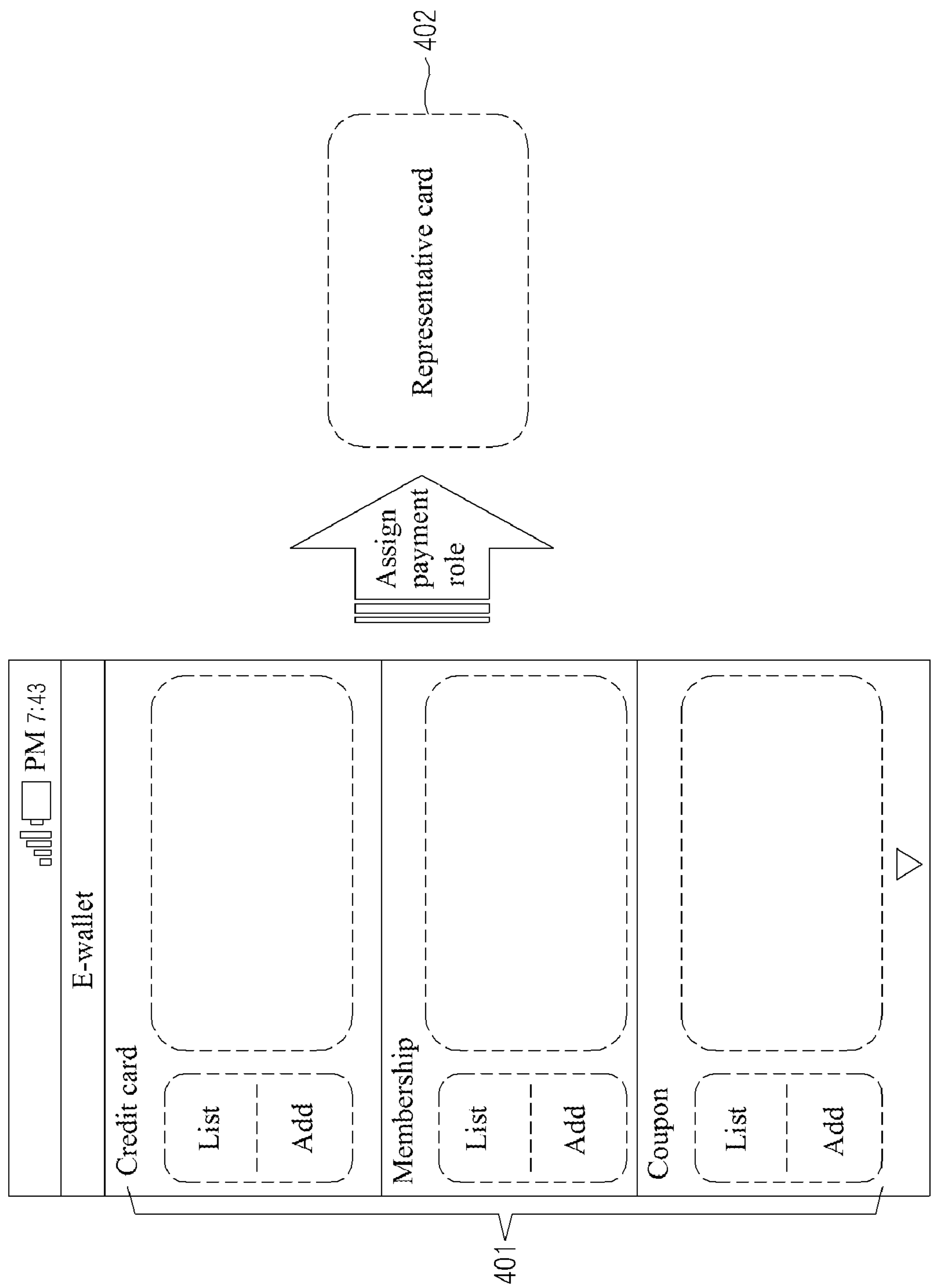
FIG. 4 illustrates a process of registering a payment tool to be represented by a representative card according to an exemplary embodiment.

In operation 310, the registerer 211 may register at least one payment tool of a user and a representative card capable of representing the at least one payment tool in association with the user. The registerer 211 may register information, for example, a card number, an account number, a mobile phone number, a coupon number, and/or a gift certificate number, required for a payment for each payment tool of the user, and may register information, for example, a card number and a code number, about the representative card that is a separate unique card issued to the user. Here, the payment tool and the representative card may be registered using an E-wallet App, or may be registered at a website/mobile site associated with the payment service system 200. For example, the registerer 211 may execute the program codes, loaded from a file of the E-wallet App to memory 240, to configure an user interface for inputting the information such as the card number, the account number, the mobile phone number, the coupon number, and/or the gift certificate number, and to store the information in storage of the user terminal. Referring to FIG. 4, the registerer 211 may register payment tools 401, such as a credit card, a membership card, and a coupon, available by the user through the E-wallet App, and may also register a representative card 402 capable of representing all of the payment tools of the user registered on the E-wallet App. The payment tools may include a payment tool for providing a payment and a benefit tool for applying a benefit. The payment tool for providing a payment may include a credit card and a debit card. The benefit tool for applying a benefit may include a membership card and a coupon. The representative card may be a proxy card for associated payment tools and may be configured to identify different types of the payment tools by identifying an identification code of each type.

Authentication may be performed based on a code of the representative card. The E-wallet app may analyze various conditions of each payment tool. For example, the E-wallet app may identify whether a credit card has a foreign transaction fee, whether the credit card provides mileage benefits for certain type of transactions, and the like. The interest rate of the credit card may also be analyzed in selecting a payment tool in association with the representative card in applying a payment processing. With regard to the membership card or coupon, the E-wallet app may connect the membership card or the coupon and an associated transaction of an affiliated store through the representative card.

Actual card information of a credit card may not be provided to an affiliated store, but code of the representative card may be provided to the affiliated store. When the code of the representative card is provided to a financial institution server, the financial institution server may identify information of a credit card associated with the representative card. Thus, the information of the credit card may be secured and may not be leaked through an affiliated store. Thus, the representative card may be a proxy electronic card that protects private information of payment tools. Further the E-wallet App is configured to link the representative card to one or more payment tools based on various criteria described herein. Thus, the representative card may be processed base on a conditional activation. For example, unlike a physical credit card, which has an expiration date, the representative card may not have a fixed expiration date, but may be conditionally activated and deactivated. Further, as described herein, the E-wallet App may conditionally link the representative card to one or more payment tools based on an analysis of a transaction type, an affiliated store, the type of each payment tool, and the like. The analysis may include a matching analysis between a characteristic of a payment tool and a transactional characteristic of an affiliated store.

In operation 320, the setter 212 may set a payment tool to assign a payment role to the representative card. More specifically, the setter 212 may match a specific payment tool among the registered payment tools to the representative card, and may assign a payment role of the specific payment tool to the representative card. For example, the setter 212 may execute program codes loaded in memory 240 for the setting. At least one payment tool that matches the representative card may be set to be available together at the event of a payment. For example, a membership card and a coupon available at an affiliate store may be selected together with a credit card and may be integrally set in the representative card. For example, a specific payment tool may be directly selected by the user in advance or at a point in time of a payment request. In response thereto, the setter 212 may set matching between the selected specific payment tool and the representative card. As another example, when a database that manages service information, for example, affiliate store information and benefit information, e.g., a discount and an interest-free installation, about all of payment tools available currently in the market is accessible, the setter 212 may automatically select a payment tool most suitable for the affiliate store from among the registered payment tools of the user at a point in time at which the user requests the payment and may match the selected payment tool to the representative card. As another example, when the user designates in advance a payment tool for each region, the setter 212 may automatically select a payment tool corresponding to a region based on location information of the user, for example, global positioning system (GPS) information, and may set matching between the selected payment tool and the representative card. As another example, when the user designates in advance a payment tool for each affiliate store, the setter 212 may automatically select a payment tool corresponding to an affiliate store at which the user is located or an affiliate store at which a payment request is made, and may set matching between the selected payment tool and the representative card. According to an exemplary embodiment, by selectively specifying and thereby matching a payment tool to a representative card and by assigning a payment role and right of the specified payment tool to the representative card as is, the representative card may represent the payment tool of the user.

In operation 330, the payment processor 213 may convert the representative card to the payment tool set in the representative card and then may process a payment for the payment tool, in response to a payment request using the representative card. For example, the payment processor 213 may execute program codes loaded in memory 240 for the converting and the processing. When more than one payment tools are matched to the representative card, the payment processor 213 may integrally process a payment about the payment tools. For example, when a credit card, a membership card, and a coupon are matched to the representative card, the payment processor 213 may integrally process a card payment, a mileage saving, and a coupon discount, using the representative card.

Further, the payment processor 213 may protect a payment process using the representative card through a predetermined security process in preparation for loss of the representative card. For example, the payment processor 213 may perform a payment process based on whether a password input from the user matches a preset password using a password of the representative card or a payment tool set in the representative card. As another example, the payment processor 213 may determine whether an E-wallet App installed in the user terminal is in execution, in interaction with the E-wallet App, and may process the payment using the representative card when the E-wallet App is determined to be in execution. As another example, the payment processor 213 may limitedly activate a payment function using the representative card during a preset period of time. Specifically, to limit a utilization time of the representative card, the payment processor 213 may activate the payment function of the representative card during a set period of time, for example, 3 minutes immediately after the E-wallet App is executed in the user terminal, and may block the payment using the representative card if the set period of time has elapsed. In this example, the set period of time to limit the payment function of the representative card may be directly set by the user or may be preset by the setting of the E-wallet App. As another example, when the user terminal is located within a predetermined radius of the affiliate store having requested the payment based on location information of the user terminal in which the E-wallet App is installed, the payment processor 213 may perform the payment process using the representative card.

Further, the payment processor 213 may perform an authentication procedure for the user using the representative card, based on a one-time password (OTP), and may perform the payment process based on a user authentication result. More specifically, the payment processor 213 may generate an OTP for authentication in response to a payment request using the representative card, may store the generated OTP for authentication in association with the representative card, and may transmit the generated OTP for authentication to the user terminal. When a reply OTP for the OTP for authentication is received from the user terminal, and when the OTP for authentication and the reply OTP match as a comparison result, the payment processor 213 may approve the payment function of the representative card. In this example, in addition to requesting a reply to the OTP for authentication, the payment processor 213 may also request a reply to at least a portion of a serial number of the representative card held by the user. Accordingly, the payment processor 213 may authenticate the validity of the representative card by comparing the serial number input from the user with the serial number registered in advance when registering the representative card.

Security methods of the representative card may be configured to be selectable by the user, and may also be applicable by combining at least two of the security methods. For example, when an input password matches a password of the representative card or a password of the payment tool set in the representative card, the payment function of the representative card may be configured to be activated during a predetermined period of time. As another example, the payment function of the representative card may be configured to be activated during an execution of the E-wallet App after the user authentication using the OTP is completed.

Although the payment service system 200, for example, the payment processor 213 is described as an entity that performs the authentication procedure using the OTP, it is only an example and thus, the authentication procedure using the OTP may be performed at, for example, the user terminal and the financial company server.

According to an exemplary embodiment, instead of holding or presenting a plurality of payment tools, the representative card may represent all of the payment tools. A payment tool to be represented by the representative card may be replaced with a payment tool selected by the user or an automatically recommended payment tool. In addition, a saving and discount process may be integrally processed at a time together with a payment process. A security setting may be set at a plurality of levels, for example, using a password or in interaction with an App.

Figure 5:
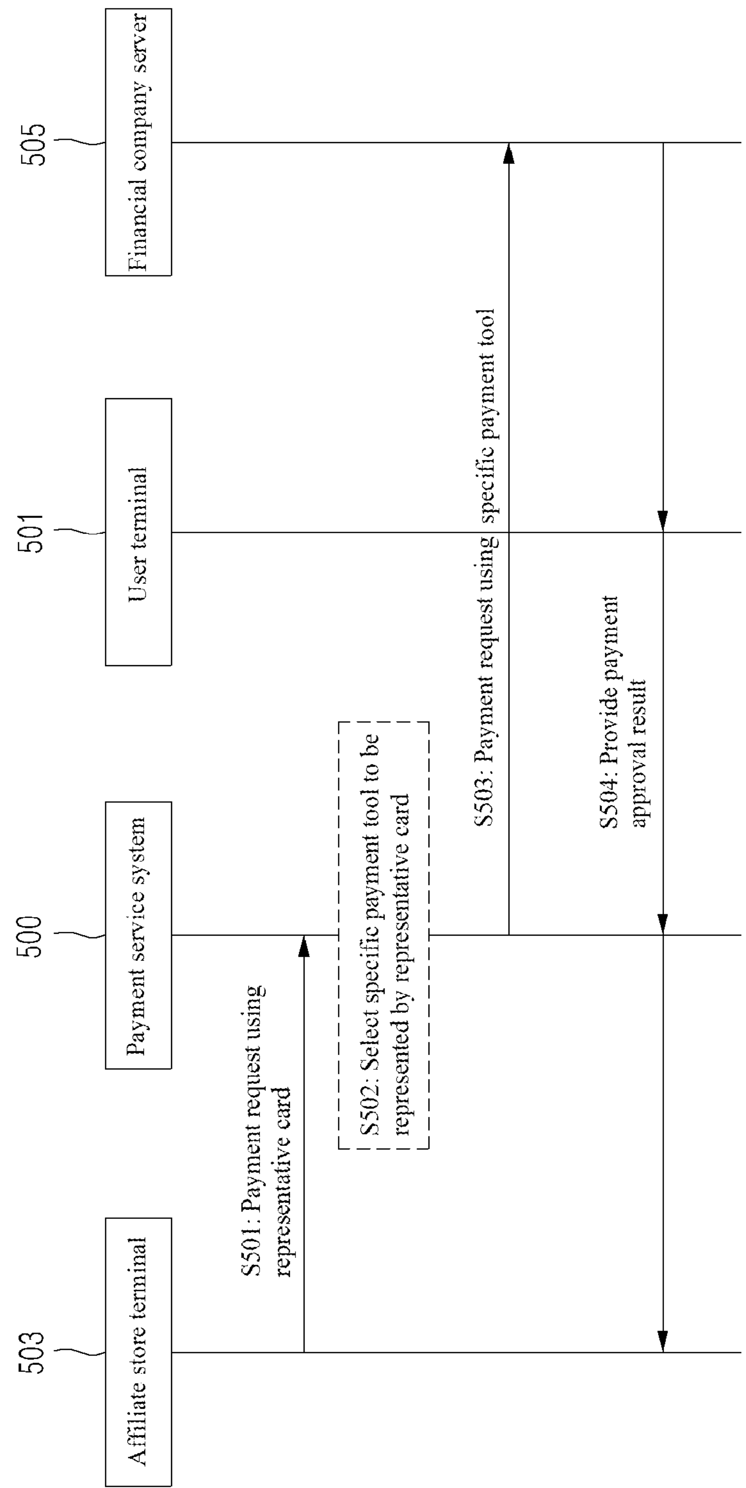
FIG. 5 illustrates a payment process using a representative card according to an exemplary embodiment.

FIG. 5 illustrates a payment process using a representative card according to an exemplary embodiment.

Referring to FIG. 5, in operation S501, a user may present a representative card instead of using a payment tool at an affiliate store for paying a purchased product in a face-to-face payment environment of an offline store or in a non-facing payment environment of an online shopping mall, and an affiliate store terminal 503 may request a payment using the representative card by transferring, to a payment service system 500, payment information including information about the representative card presented by the user. The payment information may include, for example, a payment amount, product information, and affiliate store information, In operation S502, the payment service system 500 may select a specific payment tool to be represented by the representative card from among payment tools of the user in response to the payment request of the affiliate store terminal 503. For example, the user may designate in advance a specific payment tool to be represented by the representative card among the payment tools registered by the user, and the payment service system 500 may automatically select the specific payment tool designated in advance by the user. As another example, when a payment request using the representative card is received, the payment service system 500 may request the user terminal 501 for a user selection on a specific payment tool and may receive a selection on the specific payment tool from the user terminal 501. As another example, the payment service system 500 may automatically select a payment tool most suitable for an affiliate store from among the payment tools of the user, based on service information about all of the payment tools available currently in the market. Further, information about a payment tool, such as transaction fee information, e.g., a foreign transaction fee, interest rates, credit limit of the payment tool, discount rates associated with the affiliated store, etc., may be used in selecting one or more payment tools. As another example, the user may designate in advance a payment tool to be represented by representative card for each location or each affiliate store. The payment service system 500 may automatically select a specific payment tool corresponding to a current location of the user or a specific payment tool corresponding to an affiliate store having requested the payment.

In operation S503, the payment service system 500 may request the financial company server 505 corresponding to the selected specific payment tool for a payment of payment information of the user.

In operation S504, the financial company server 505 may process a payment approval for payment information of the user, and may provide a payment approval result to at least one of the user terminal 501, the affiliate store terminal 503, and the payment service system 500.

FIG. 6 illustrates a payment process using a representative card according to an exemplary embodiment.

Referring to FIG. 6, in operation S601, a user may purchase a product in a face-to-face payment environment of an offline store or in a non-facing payment environment of an online shopping mall, and may execute an E-wallet App on a user terminal 601 for a payment using a representative card.

In operation S602, when the E-wallet App is executed in the user terminal 601, a payment service system 600 may activate a payment function of the representative card to enable the payment using the representative card.

In operation S603, when the payment function of the representative card is activated through the execution of the E-wallet App, the user may present not a payment tool but the representative card at an affiliate store for paying a purchased product, and an affiliate store terminal 603 may request the payment using the representative card by transferring, to the payment service system 600, payment information including information about the representative card presented by the user. The payment information may include, for example, a payment amount, product information, and affiliate store information.

Operations S604 through S606 of FIG. 6 are identical to operations S502 through S504 of FIG. 5 and thus, a further description related thereto will be omitted.

In addition, the payment service system 600 may activate the payment function of the representative card during a preset period of time from a point in time at which the E-wallet App is executed. If the set period of time has elapsed, the payment service system 600 may release a payment role or right assigned to the representative card and may block the payment function of the representative card.

Accordingly, the payment service system 600 may activate the payment function of the representative card during an execution of the E-wallet App or may activate the payment function of the representative card during a preset period of time, thereby enhancing a security system.

FIG. 7 illustrates a payment process using a representative card according to an exemplary embodiment.

Referring to FIG. 7, in operation S701, when a user presents a representative card for a payment, an affiliate store terminal 703 may request the payment using the representative card by transferring, to a payment service system 700, payment information including information about the representative card presented by the user. The payment information may include, for example, a payment amount, product information, and affiliate store information.

When the payment request is received from the affiliate store terminal 703, the payment service system 700 may generate an OTP for authentication with respect to the representative card and may transmit the OTP for authentication to a user terminal 701 together with the payment request using the representative card in operation S702. In this instance, the payment service system 700 may transmit a message including the OTP for authentication to the user terminal 701 through a message server (not shown) that provides a short message service (SMS) or the like. Further, the payment service system 700 may request the user's response to the OTP for authentication. Further, the payment service system 700 may request the user's response including at least a portion, for example, first, third, and fifth-digit numbers from the left side, of a serial number of the representative card held by the user together with a reply to the OTP for authentication.

In operation S703, the user terminal 701 may receive a reply OTP from the user as the reply to the OTP for authentication, and may transmit the reply OTP to the payment service system 700. To this end, in response to the payment request of the affiliate store terminal 703, the payment service system 700 may interact with an E-wallet App installed in the user terminal 701. An input screen capable of inputting a reply OTP corresponding to the OTP for authentication may be executed in the E-wallet App. When the payment service system 700 requests a reply including at least a portion of the serial number of the representative card, an input screen capable of inputting the serial number of the representative card together with the reply OTP may be executed in the E-wallet App.

In operation S704, the payment service system 700 may authenticate the OTP validity by comparing the OTP for authentication transmitted to the user terminal 701 with the reply OTP received from the user terminal 701. When the OTP for authentication and the reply OTP match, the payment service system 700 may approve the payment function of the representative card. In addition, the payment service system 700 may additionally authenticate the validity of the representative card by comparing the serial number received from the user terminal 701 as the reply and the serial number registered in advance when registering the representative card.

Operations S705 through S707 of FIG. 7 are identical to operations S502 through S504 of FIG. 5 and thus, a further detailed description related thereto will be omitted.

According to an exemplary embodiment, the payment service system 700 may generate and store OTP information, and may perform an authentication procedure to approve a payment function of a representative card based on a user reply.

Figure 8:
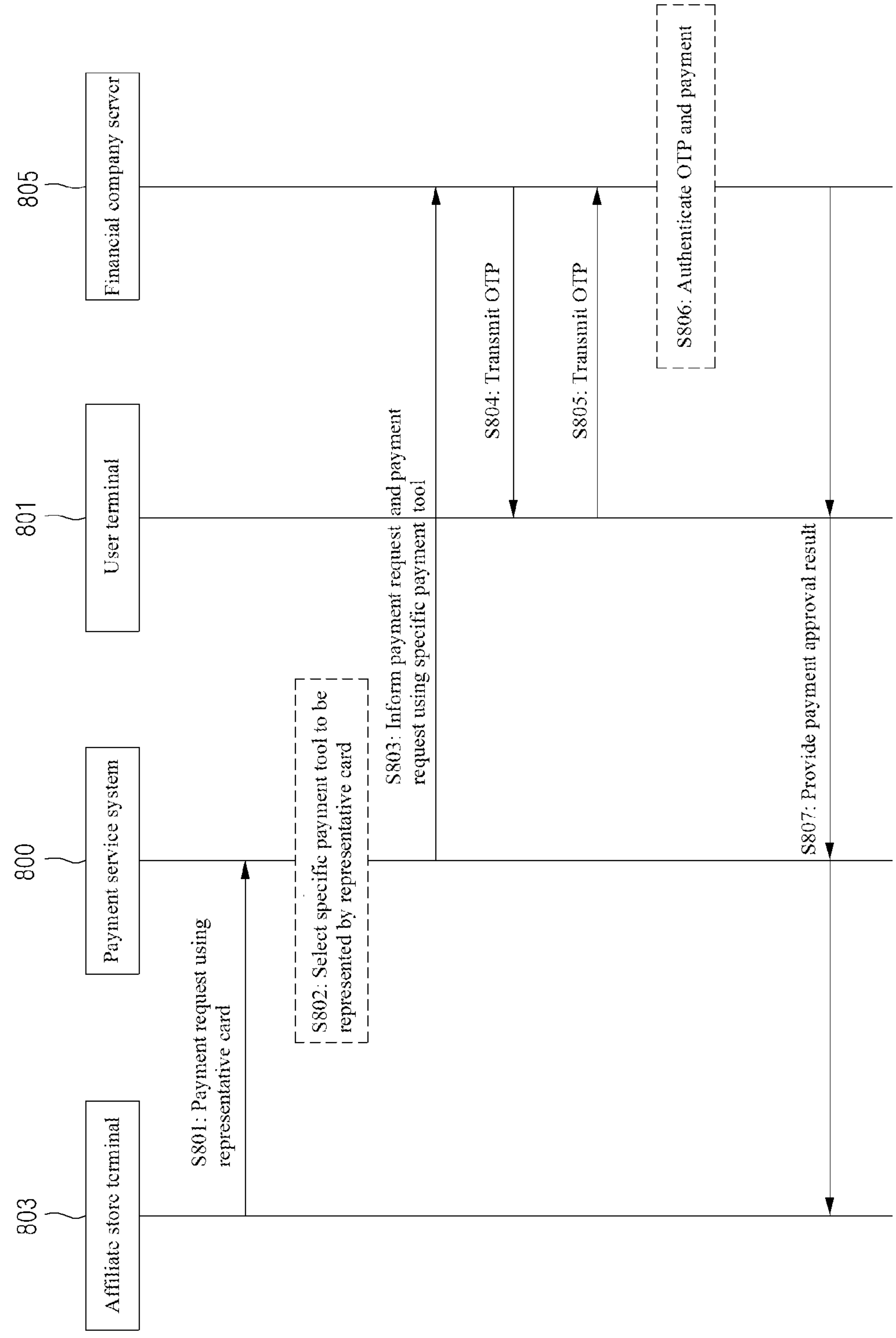

FIG. 8 illustrates a payment process using a representative card according to an exemplary embodiment.

Referring to FIG. 8, in operation S801, if a user presents a representative card for a payment, an affiliate store terminal 803 may request the payment using the representative card by transferring, to a payment service system 800, payment information including information about the representative card presented by the user. The payment information may include, for example, a payment amount, product information, and affiliate store information, In operation S802, in response to the payment request of the affiliate store terminal 803, the payment service system 800 may select a specific payment tool to be represented by the representative card from among payment tools of the user. Methods of selecting a specific payment tool are described above with reference to operation S502 of FIG. 2 and thus, a further description will be omitted.

In operation S803, the payment service system 800 may transfer the payment request using the representative card by requesting a financial company server 805 corresponding to the selected specific payment tool for a payment for payment information of the user.

In operation S804, the financial company server 805 may generate an OTP for authentication for the representative card requested by the affiliate store terminal 803, and may transmit the OTP for authentication to the user terminal 801 together with the payment request using the representative card. The financial company server 805 may transmit a message including the OTP for authentication to a user terminal 801 through a message server (not shown) that provides an SMS or the like. Further, through the message, the financial company server 805 may request the user's response to the OTP for authentication. Further, the financial company server 805 may request the user's response including at least a portion, for example, first, third, and fifth-digit numbers from the left side, of a serial number of the representative card held by the user together with a reply to the OTP for authentication.

In operation S805, the user terminal 801 may receive a reply OTP from the user as the reply to the OTP for authentication, and may transmit the reply OTP to the financial company server 805. To this end, in response to the payment request of the affiliate store terminal 803, the payment service system 800 may interact with an E-wallet App installed in the user terminal 801. An input screen capable of inputting, by a user, a reply OTP to the OTP for authentication may be executed in the E-wallet App. When authenticating the validity of the representative card using the serial number in addition to the OTP validity, an input screen capable of inputting the serial number of the representative card together with the reply OTP may be executed in the E-wallet App.

In operation S806, the financial company server 805 may authenticate the OTP validity by comparing the OTP for authentication transmitted to the user terminal 801 with the reply OTP received from the user terminal 801. If the OTP for authentication and the reply OTP match, the financial company server 805 may approve the payment function of the representative card. In addition, the financial company server 805 may additionally authenticate the validity of the representative card by comparing the serial number received from the user terminal 801 as the reply with the serial number registered in advance when registering the representative card. In operation S806, when the payment function of the representative card is approved through the authentication procedure using the OTP, the financial company server 805 may process the payment approval for payment information of the user. In operation S807, the financial company server 805 may provide a payment approval result to at least one of the user terminal 801, the affiliate store terminal 803, and the payment service system 800.

According to an exemplary embodiment, the financial company server 805 may generate and store OTP information, and may directly perform an authentication procedure to approve a payment function of a representative card based on a user reply.

Figure 9:
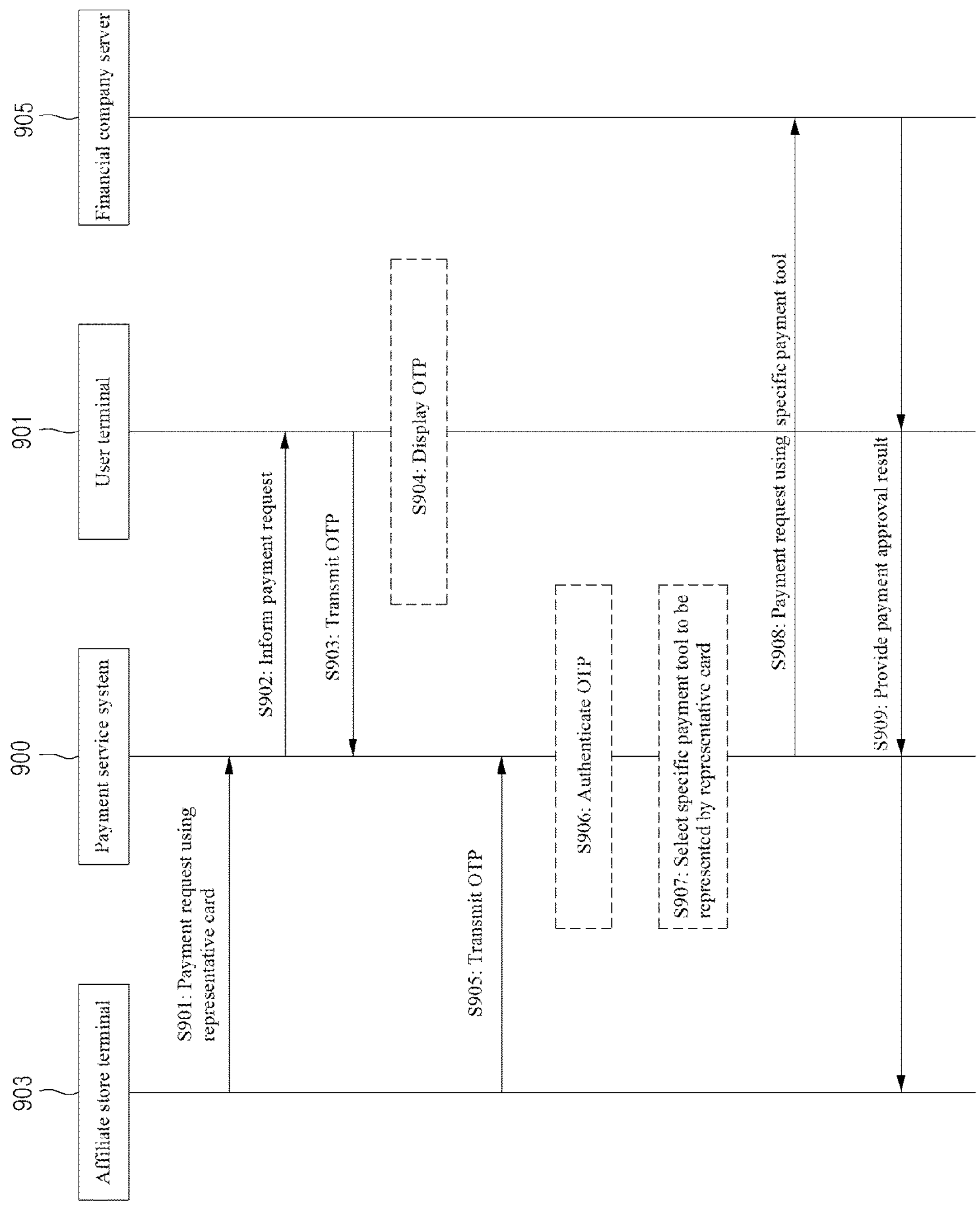

FIG. 9 illustrates a payment process using a representative card according to an exemplary embodiment.

Referring to FIG. 9, in operation S901, when a user presents a representative card for a payment through the user terminal 901, an affiliate store terminal 903 may request the payment using the representative card by transferring, to a payment service system 900, payment information including information about the representative card presented by the user. Here, the payment information may include, for example, a payment amount, product information, and affiliate store information.

When the payment request is received from the affiliate store terminal 903, the payment service system 900 may inform the user of the payment request using the representative card in interaction with an E-wallet App installed in a user terminal 901 in operation S902.

The user terminal 901 may generate an OTP for authentication for the representative card according to a control of the E-wallet App and transmit the OTP for authentication to the payment service system 900 in operation S903, and may simultaneously display the OTP for authentication on a screen of the E-wallet App in operation S904. Here, the user may present the OTP for authentication displayed on a terminal screen to an affiliate store by directly showing the terminal screen at the affiliate store in the case of an offline payment by inputting on a service screen of a shopping mall in the case of an online payment.

In operation S905, the affiliate store terminal 903 may transmit the OTP for authentication presented by the user to the payment service system 900.

In operation S906, the payment service system 900 may authenticate the OTP validity by comparing the OTP for authentication received from the user terminal 901 with the OTP for authentication received from the affiliate store terminal 903. If the above two OTPs for authentication match, the payment service system 900 may approve a payment function of the representative card.

The payment service system 900 may request the user terminal 901 to input at least a portion of a serial number of the representative card being held by the user, and may additionally authenticate the validity of the representative card based on a user reply to the request.

Operations S907 through S909 of FIG. 9 are identical to operations S502 through S504 of FIG. 5 and thus, a further detailed description related thereto will be omitted.

According to an exemplary embodiment, the user terminal 901 may generate and store OTP information, and the payment service system 900 may perform an authentication procedure to approve a payment function of a representative card based on a reply from a user and a reply from an affiliate store.

Figure 10:
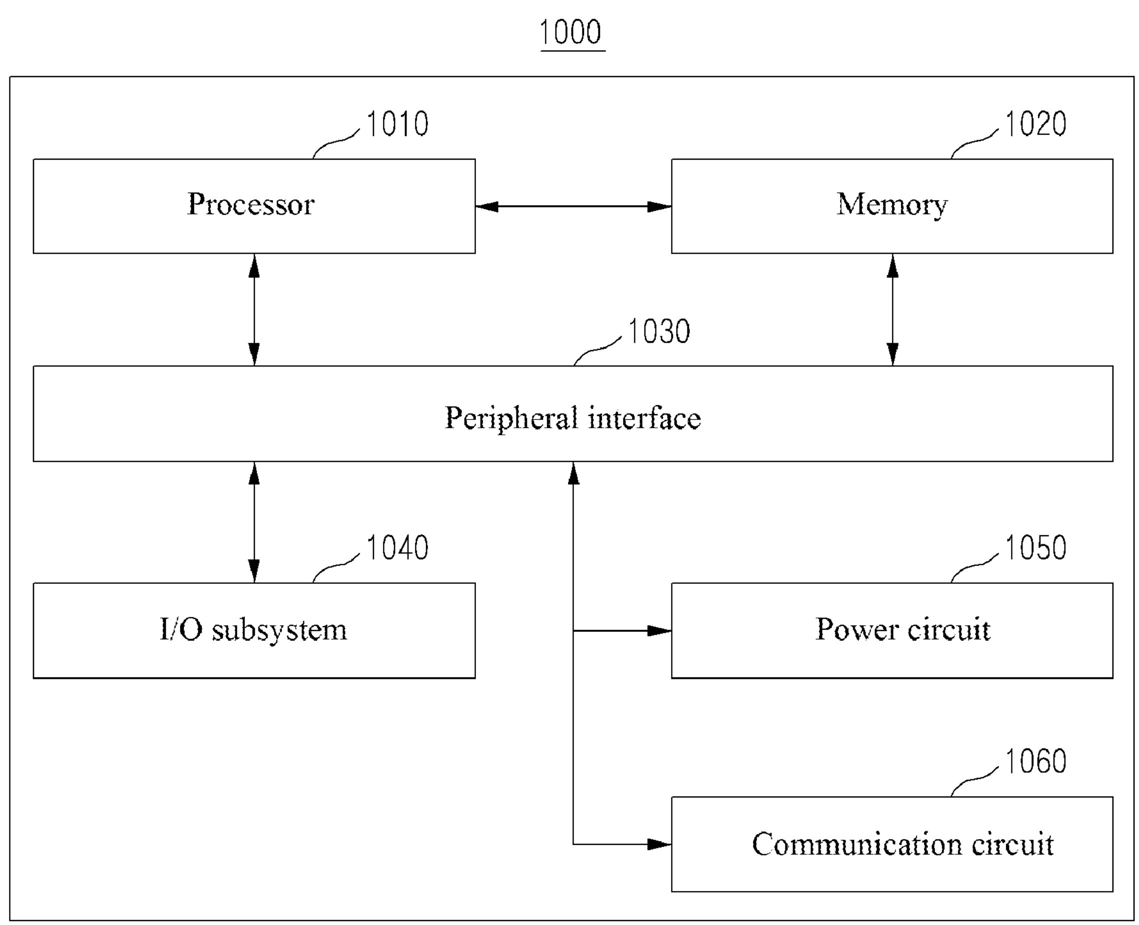
FIG. 10 is a block diagram illustrating a configuration of a computer system according to an exemplary embodiment.

FIG. 10 is a block diagram illustrating a configuration of a computer system according to an exemplary embodiment. Referring to FIG. 10, the computer system 1000 may include at least one processor 1010, a memory 1020, a peripheral interface 1030, an input/output (I/O) subsystem 1040, a power circuit 1050, and a communication circuit 1060. The computer system 1000 may correspond to a user terminal described above.

The memory 1020 may include, for example, a high-speed random access memory (HSRAM), a magnetic disk, a static random access memory (SRAM), a dynamic RAM (DRAM), read only memory (ROM), a flash memory, and a non-volatile memory. The memory 1020 may include a software module, an instruction set, or a variety of data required for an operation of the computer system 1000. Here, an access from another component such as the processor 1010 and the peripheral interface 1030 to the memory 1020 may be controlled by the processor 1010.

The peripheral interface 1030 may couple an input device and/or output device of the computer system 1000 with the processor 1010 and the memory 1020. The processor 1010 may perform a variety of functions for the computer system 1000 and process data by executing the software module or the instruction set stored in the memory 1020.

The I/O subsystem 1040 may couple various I/O peripheral devices with the peripheral interface 1030. For example, the I/O subsystem 1040 may include a controller for coupling the peripheral interface 1030 and a peripheral device such as a monitor, a keyboard, a mouse, a printer, and a touch screen or a sensor (not shown). The I/O peripheral devices may be coupled with the peripheral interface 1030 without using the I/O subsystem 1040.

The power circuit 1050 may supply power to all of or a portion of components of a terminal. For example, the power circuit 1050 may include a power management system, at least one power source such as a battery and alternating circuit (AC), a charge system, a power failure detection circuit, a power converter or inverter, a power status indicator, or other components for creating, managing and distributing power.

The communication circuit 1060 enables communication with another computer system using at least one external port. Alternatively, as described above, the communication circuit 1060 may enable communication with another computer system by including a radio frequency (RF) circuit and thereby transmitting and receiving an RF signal known as an electromagnetic signal.

The configuration illustrated in FIG. 10 is only an example of the computer system 1000. The computer system 1000 may have a configuration or an arrangement by omitting a portion of the components illustrated in FIG. 10, or including additional components not illustrated in FIG. 10, or coupling two or more components. For example, a computer system for a communication terminal of a mobile environment may further include a touch screen, a sensor, and the like, in addition to the components of FIG. 10. A circuit for RF communication using a variety of communication methods, for example, wireless fidelity (Wi-Fi), 3rd generation (3G), long term evolution (LTE), Bluetooth, near field communication (NFC), and ZigBee, may be included in the communication circuit 1060. Components includable in the computer system 1000 may be configured as hardware that includes an integrated circuit specified for at least one signal processing or application, software, or a combination of hardware and software.

The methods according to the illustrated exemplary embodiments may be configured as program instructions executable through various computer systems and may be recorded in non-transitory computer-readable media.

A program according to the illustrated exemplary embodiments may be configured as a PC-based program or an application exclusive for a mobile terminal. An E-wallet App according to the illustrated exemplary embodiments may be configured in an in-app form of a specific application and may be operable on the specific application.

Further, the methods according to the illustrated exemplary embodiments may be performed in such a manner that an application associated with a server system that provides a payment service controls a user terminal. The application according to the illustrated exemplary embodiments may be installed in the user terminal through a file provided from a file distribution system. As an example, the file distribution system may include a file transmitter (not shown) configured to transmit the file in response to a request from the user terminal.

As described above, according to an exemplary embodiment, it is possible to perform a safe and convenient payment with protecting information of a payment tool by performing an online/offline payment using a representative card capable of representing all of the payment tools. According to an exemplary embodiment, it is possible to enhance a user convenience in a payment by automatically selecting and changing a payment tool to be represented by a representative card based on location information or affiliate store information. According to an exemplary embodiment, it is possible to further enhance a payment security by activating a representative card in interaction with an application on a terminal and thereby preparing for loss of the representative card capable of ensuring a safe payment. According to an exemplary embodiment, since a user is allowed to make a payment using only a single representative card instead of holding all of actual payment tools, it is possible to maintain an existing payment infrastructure and to provide a convenient and familiar user experience (UX) payment service. Further, according to an exemplary embodiment, it is possible to outperform vulnerability of a security occurring due to repetitive use of the same password by authenticating a user using a representative card with a randomly generated OTP instead of using a fixed password.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device capable of providing instructions or data to or being interpreted by the processing device. The software may be distributed over network coupled computer systems so that the software is stored and executed in a distributed fashion. In particular, the software and data may be stored by one or more computer readable recording mediums.

The above-described exemplary embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

According to exemplary embodiments, it is possible to perform a safe and convenient payment while protecting information of a payment tool by performing an online/offline payment using a representative card capable of representing all or some of the payment tools.

According to exemplary embodiments, it is possible to enhance a user convenience in a payment by automatically selecting and changing a payment tool to be represented by a representative card based on location information or affiliate store information.

According to exemplary embodiments, it is possible to further enhance a payment security by activating a representative card in interaction with an application on a terminal and thereby preparing for loss of the representative card capable of ensuring a safe payment.

According to exemplary embodiments, since a user is allowed to make a payment using only a single representative card instead of holding all of actual payment tools, it is possible to maintain an existing payment infrastructure and to provide a convenient and familiar user experience (UX) payment service.

According to exemplary embodiments, it is possible to outperform vulnerability of a security occurring due to the repetitive use of the same password by authenticating a user using a representative card based on a randomly generated one-time password (OTP) instead of using a fixed password.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A payment service method comprising:

registering, at a payment service, a representative card that represents a plurality of existing payment tools of a user, the representative card being issued in a form of a real credit card having a serial number printed thereon, and the payment tools selected from the group consisting of a credit card, a check card, a mobile card, a reward credit card, a gift certificate, a coupon, and an account;

activating, at the payment service, a payment function of the representative card only during a preset time period determined by an application after an execution of the application in a terminal of the user, the application being associated with the payment service and installed in the terminal of the user, the activating of the payment function of the representative card comprises activating the payment function of the representative card in response to an input of the user matching a preset input that is made by the user in response to a request, sent to the user by a card authentication entity separate from the payment service, to input a series of numbers corresponding a non-sequential portion of the serial number printed on the representative card;

automatically setting at least one specific payment tool to be represented by the representative card by automatically selecting the at least one specific payment tool among the payment tools at the payment service, wherein information about the at least one specific payment tool corresponds to a region or an affiliate store, and the automatically setting of the at least one specific payment tool comprises automatically setting, as the at least one specific payment tool, a payment tool that is designated by matching the region or the affiliate store corresponding to location information of the user based on the location information of the terminal of the user;

processing a payment at the payment service using the at least one specific payment tool set in the representative card, in response to a payment request using the representative card; and in response to the location information associated with the user being changed, automatically re-setting another specific payment tool to be represented by the representative card by automatically re-selecting the another specific payment tool among the payment tools at the payment service, the another specific payment tool having been designated to a region or an affiliate store corresponding to the changed location information.

2. The method of claim 1, wherein the activating of the payment function of the representative card comprises activating the payment function of the representative card during an execution of the application in the terminal of the user.

3. The method of claim 1, wherein the activating of the payment function of the representative card comprises activating the payment function of the representative card during a set period of time associated with an execution point in time of the application.

4. The method of claim 1, wherein the input from the user is performed using at least one of the terminal of the user, the application, a terminal of an affiliate store associated with the payment request, and the representative card.

5. The method of claim 1, wherein the automatically setting of the at least one specific payment tool comprises automatically setting, as the at least one specific payment tool, a payment tool selected by the user using location information associated with the user and at least one of the terminal of the user, the application, a terminal of an affiliate store associated with the payment request, and the representative card.

6. The method of claim 1, wherein the automatically setting of the at least one specific payment tool comprises automatically setting, as the at least one specific payment tool, more than one payment tool that comprise: a) a payment tool for paying an amount in response to the payment request, b) a benefit tool associated with a benefit corresponding to paying the amount, and c) a coupon tool applies a discount associated with an affiliate store for which the payment request is being made.

7. The method of claim 1, wherein the processing of the payment comprises, in response to automatically setting, as the at least one specific payment tool, more than one payment tool that comprise: a) a payment tool for paying an amount in response to the payment request, and b) a benefit tool associated with a benefit corresponding to paying the amount, processing an integrated payment using the payment tool and the benefit tool.

8. The method of claim 1, wherein the payment function of the representative card is configured to be approved based on an authentication method using a one-time Password (OTP).

9. The method of claim 1, further comprising:

generating a first OTP in response to the payment request using the representative card, and transmitting the first OTP to the terminal of the user; and approving the payment function of the representative card by comparing the first OTP and a second OTP in response to receiving the second OTP by an input of the user from the terminal.

10. The method of claim 1, wherein the processing of the payment comprises:

processing the payment using the specific payment tool set in the representative card in interaction with a financial company server associated with the specific payment tool, wherein the financial company server generates a first OTP in response to the payment request, transmits the first OTP to the terminal of the user, and approves the payment function of the representative card by comparing the first OTP with a second OTP in response to receiving the second OTP by an input of the user from the terminal.

11. The method of claim 1, further comprising:

transmitting a message associated with the payment request to the terminal of the user in response to the payment request using the representative card;

receiving, from the terminal of the user, a first OTP that is generated at the terminal in response to the payment request, and receiving, from a terminal of an affiliate store, a second OTP presented by the user; and approving the payment function of the representative card by comparing the first OTP and the second OTP.

12. A payment service system comprising:

a registerer configured to register a representative card that represents a plurality of existing payment tools of a user, the representative card being issued in a form of a real credit card having a serial number printed thereon, and the payment tools selected from the group consisting of a credit card, a check card, a mobile card, a reward credit card, a gift certificate, a coupon, and an account;

a setter configured to automatically set at least one specific payment tool to be represented by the representative card among the payment tools, wherein information about at least one payment tool corresponds to a region or an affiliate store, and the automatically setting of the at least one specific payment tool by the setter comprises automatically setting, as the at least one specific payment tool, a payment tool that is designated by matching the region or the affiliate store corresponding to location information of the user based on location information of the terminal of the user; and a payment processor configured to activate a payment function of the representative card only during a preset time period determined by an application associated with the payment service after an execution of the application installed in the terminal of the user and after receiving, by the payment processor, an input of the user matching a preset input that is made by the user in response to a request, sent by the payment processor to the user, to input a series of numbers corresponding to a non-sequential portion of serial number printed on the representative card, and to process a payment using the specific payment tool set in the representative card, in response to a payment request using the representative card, and wherein, in response to the location information associated with the user being changed, the setter automatically re-sets another specific payment tool to be represented by the representative card by automatically re-selecting the another specific payment tool among the payment tools at the payment service, the another specific payment tool having been designated to a region or an affiliate store corresponding to the changed location information.

13. The payment service system of claim 12, wherein the payment processor is further configured to activate the payment function of the representative card in response to an input password of the user matching a preset password.

* * * * *